Sept. 19, 1972   A. M. MAYO   3,692,585
FUEL CELL BATTERY

Filed May 21, 1969   4 Sheets-Sheet 1

INVENTOR.
ALFRED M. MAYO
BY
Edwin Coates
- ATTORNEY -

Sept. 19, 1972    A. M. MAYO    3,692,585
FUEL CELL BATTERY

Filed May 21, 1969    4 Sheets-Sheet 2

INVENTOR.
ALFRED M. MAYO
BY Edwin Coates
-ATTORNEY-

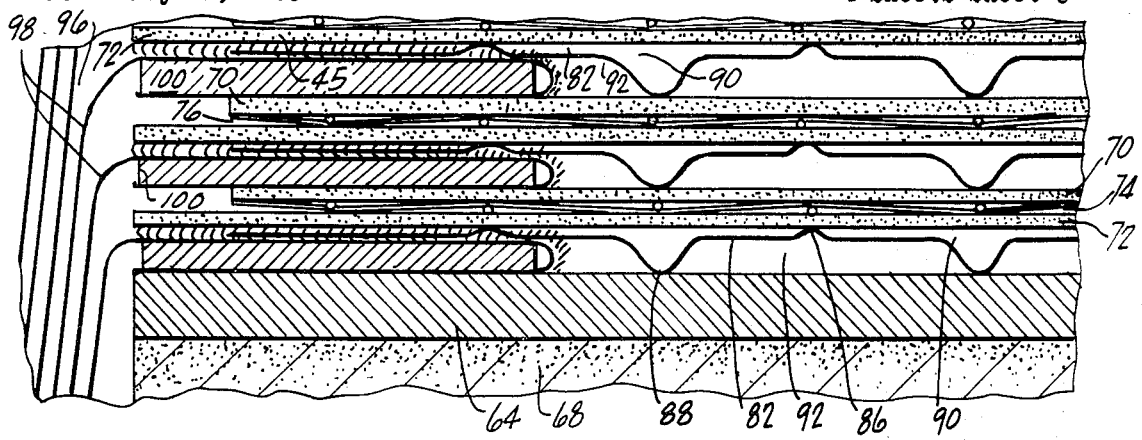
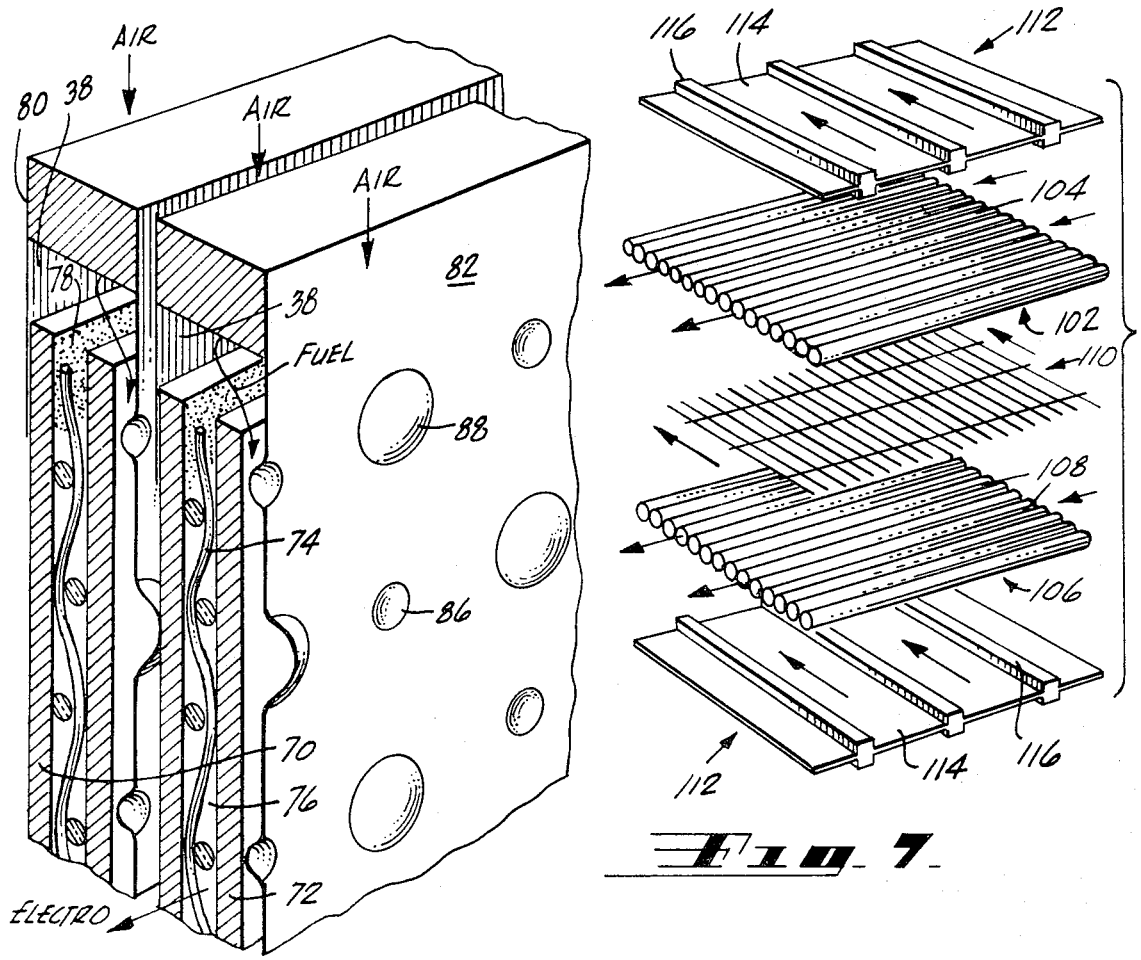

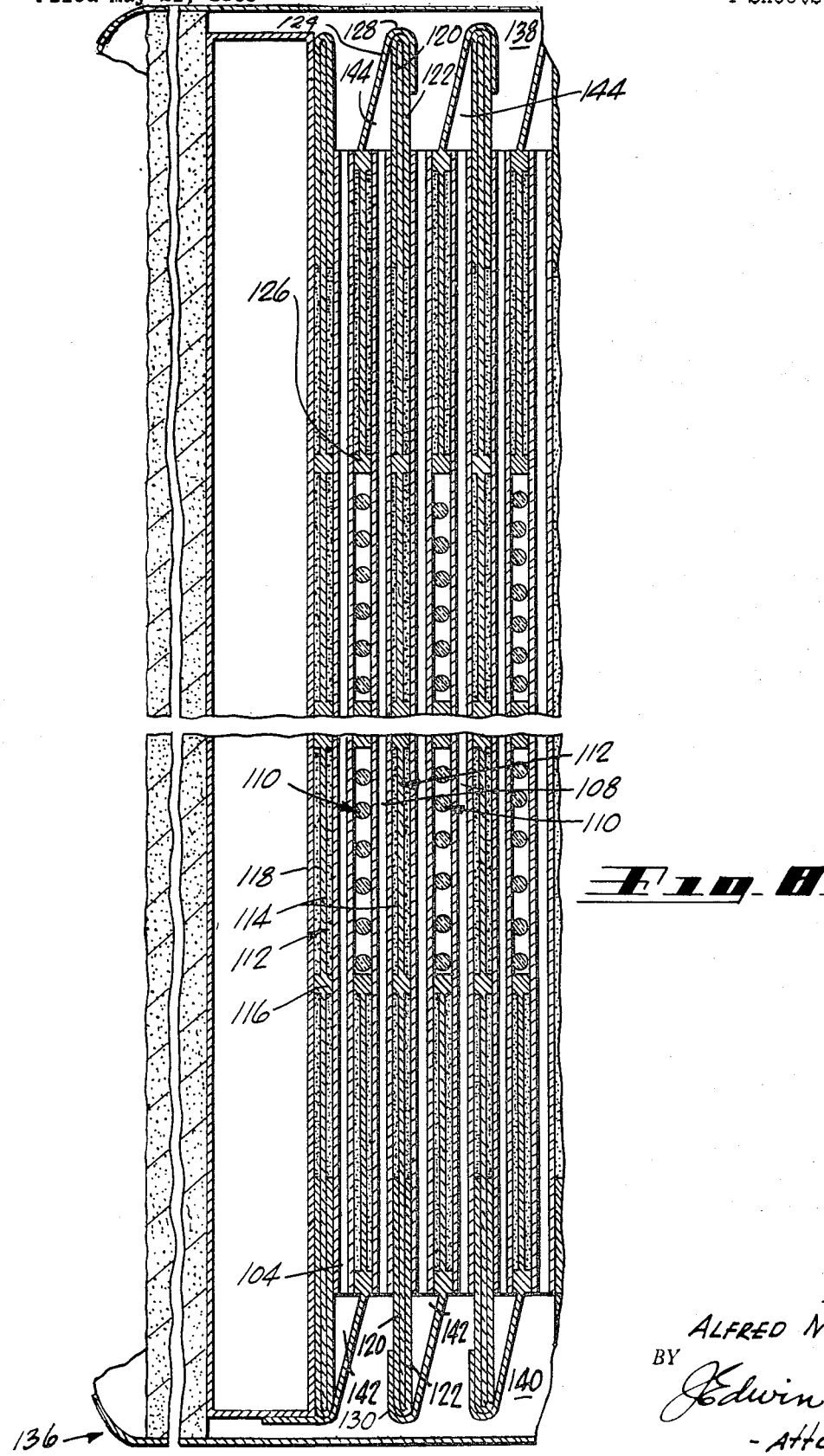

United States Patent Office 3,692,585
Patented Sept. 19, 1972

3,692,585
FUEL CELL BATTERY
Alfred M. Mayo, 30828 Marne Drive, Palos Verdes
Peninsula, Calif. 90274
Filed May 21, 1969, Ser. No. 826,419
Int. Cl. H01m 27/02, 27/04
U.S. Cl. 136—86 R
8 Claims

ABSTRACT OF THE DISCLOSURE

Battery is made very light, compact, and efficient by making fuel cell units very thin and generally flat and rectangular. Cell units are stacked in facewise relation to make box like structure and electrically connected in series for working voltage. Each unit comprises fuel and oxidant electrode layers spaced by permeable insulating layer to provide electrolyte passage. Impervious, conductive barrier layer between each pair of adjacent cell units and in contact with both. In one form barrier layer has protuberances on each side contacting units to provide fuel and oxidant gas passages. Insulating layer has wettable surface and maintains electrolyte in contact with electrodes for high efficiency. It is about .010 inch or less thick to produce minimum ion path. Electrode layers are about .005 inch thick or less. All elements are held in tight facewise contact for compactness and also to cause all elements to provide structural support for each other.

BACKGROUND OF THE INVENTION

This invention lies in the field of electrochemical reaction power sources or fuel cell batteries of the type in which fuel and oxidant fluids are diffused through porous walls into contact with a liquid electrolyte, the walls being in spaced relation, and suitable catalysts are used to produce chemical reactions giving off electrons to produce an electric potential between the walls. The invention is directed more particularly to batteries of this type in which a multitude of cell units producing potentials of somewhat less than one volt each are arranged in compact relation and connected in series to produce a usable working voltage such as 120 or 480 volts.

Many different versions of fuel cell batteries of the general type mentioned above have been designed and used with varying degrees of success. Despite the urgent need for compactness, light weight, and reasonable cost most of such batteries have been very bulky and heavy because their designs have included much waste space and components which were far larger and heavier than necessary to produce the small amount of power achieved. This resulted from failure to take full advantage of the latest technology stressing the importance of a thin film zone of electrochemical activity. While many of the previous systems were usable by necessity in special applications, none of them so far as known would produce an amount of power per pound and per unit of volume which would make them practical for commercial use such as mobile power supplies for automobiles or other vehicles. Moreover, such systems were not efficient enough to be used for commercial purposes.

SUMMARY OF THE INVENTION

The present invention overcomes the difficulties and drawbacks mentioned above by providing a fuel cell battery which produces adequate power for a variety of purposes while remaining very compact and relatively light in weight. A battery built in accordance with the features of the present invention will produce usable power of about 100 kilowatts with a volume of about one and one quarter to one and one half cubic feet and a weight of about two hundred pounds or less without a few relatively small and light accessories.

The present battery is made up of a multitude of fuel cell units which are very thin and generally flat and rectangular in planform, and which are stacked in facewise relation to form a box-like or cubical unit. In a typical example, a battery producing 100 kilowatts which would be ample for a small or medium automobile contains about 600 fuel cell units approximately 12 inches square and about .0255 inch thick which occupy about one and one quarter cubic feet without accessories.

Each cell unit is made up of two identical electrodes in the form of porous graphite layers, each having a thickness of about .005 inch or less, separated by a porous, insulative layer of wettable material, preferably formed of glass fiber filaments, in contact with both graphite layers to maintain a spacing between them of about .0025 inch serving as a flow passage for liquid electrolyte. When the electrodes are about .005 inch thick they are treated on their electrolyte surface with hydrophobic and catalyst materials. Because of new technology the electrodes may be made about .002 inch thick. In this case, they are treated on their electrolyte surfaces with catalyst material and on their fuel or oxidant surfaces with hydrophobic material. The wettable separator layer maintains the liquid electrolyte in contact with the catalyzed surface to facilitate maximum electrochemical action, and the minute spacing between electrodes insures maximum ion conduction.

The fuel electrode of one cell unit is spaced from the oxidant electrode of the adjacent cell unit a distance of about .013 inch by a conductive, impervious barrier layer, which also serves to connect the cells in electrical series since it is in contact with both of them. In one form of the invention as disclosed, protuberances extend in both directions with respect to the barrier layer to contact the electrodes so as to provide flow passages between the main body of the barrier layer and the two adjacent electrodes for the flow of fuel and oxidant fluids.

Suitable headers are provided to direct the flow of fluids and electrolyte into and out of the respective flow channels. Means are also provided for the recirculation of electrolyte in the form of an external passage having an enlarged section for purification of the electrolyte and a pump for forcing circulation through the cells. Flexible partitions are provided within the passage to maintain separate the electrolyte from each cell to reduce short circuit losses.

The entire cell pack is firmly held within a non-conductive enclosure so that all of the cells are tightly packed together, insuring proper contact of all of the components. Because of the firm facewise contact between the components, all of them provide structural support to each other.

BRIEF DESCRIPTION OF THE DRAWINGS

Various other advantages and features of novelty will become apparent as the description proceeds in conjunction with the accompanying drawings, in which:

FIG. 5 is a perspective view, partly in section, of a portion of the cell unit assembly;

FIG. 6 is a view similar to FIG. 4, taken on line 6—6 of FIG. 2, illustrating the arrangement of the electrolyte separator films;

FIG. 7 is an exploded view of a portion of a cell unit showing a modified form of the electrodes; and FIG. 8 is a sectional view showing the arrangement of cell units embodying the modified electrodes.

DESCRIPTION OF PREFERRED EMBODIMENTS

Figure 1:
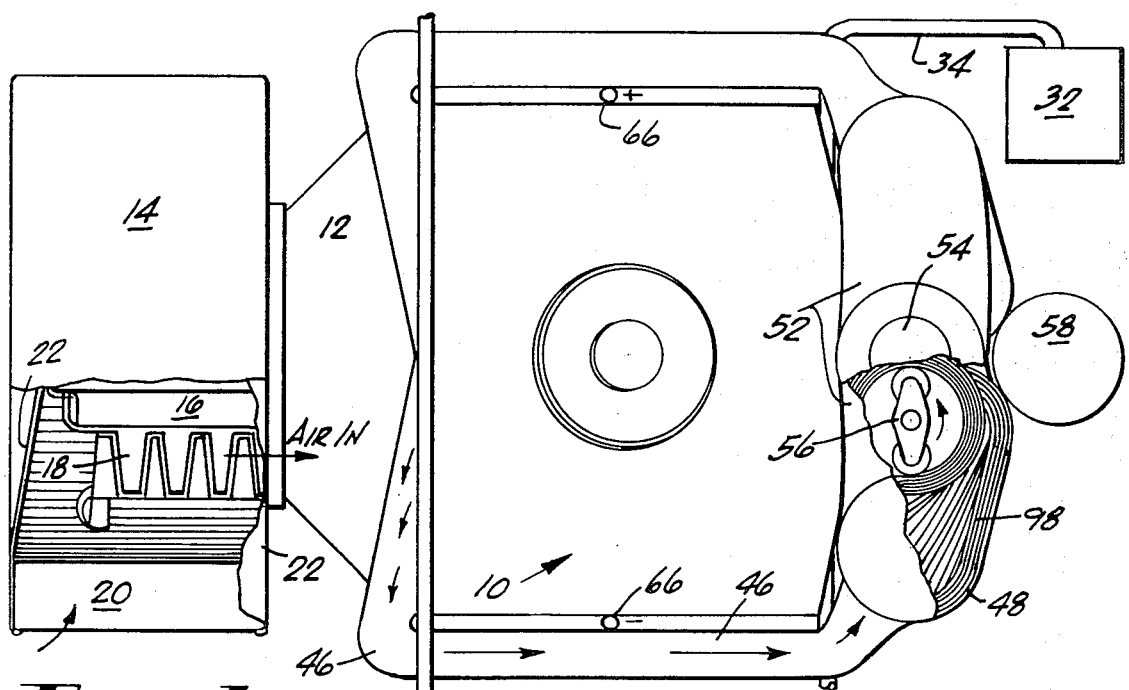
FIG. 1 is a schematic plan view, partly in section, of one form of the invention.
Figure 2:
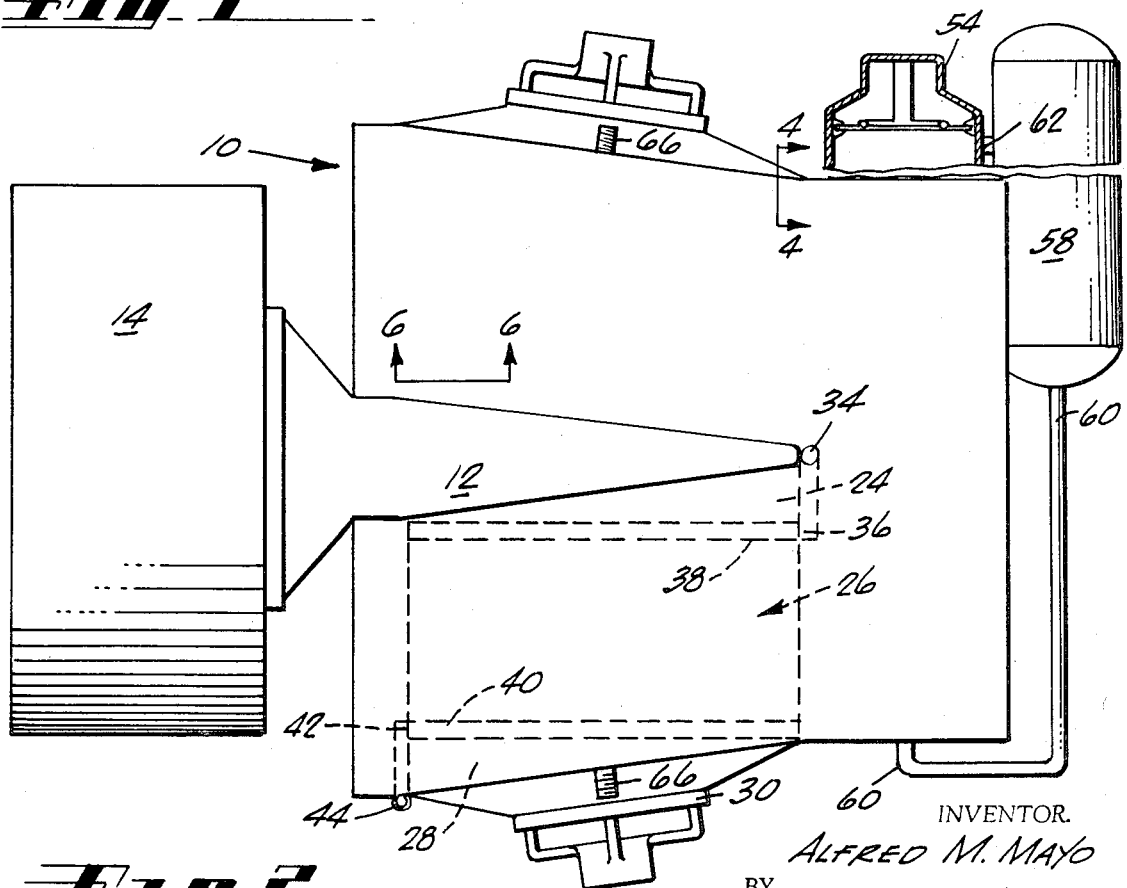
FIG. 2 is a schematic elevational view of the invention.

A typical battery assembly embodying the features of the invention is generally illustrated in FIGS. 1 and 2, where it will be seen that the enclosure or casing 10 within which the multiple cell units are located is generally box-like or cubical. The assembly is divided into upper and lower substantially identical halves by an air inlet manifold 12 which conducts air from an inlet fan unit 14. This unit includes a central electric motor 16 driving an axial flow compressor 18, circumscribed by an annular accordion type air filter 20 and provided with appropriate shielding 22 to ensure that all air entering the compressor passes through the filter.

The manifold 12 discharges air into secondary manifold 24, FIG. 2, which overlies all of the cells 26 in the lower half of the assembly. The air then passes down between the cells into exhaust manifold 28, whence it exits through the air pressure regulator 30. A source of pressurized fuel is provided at 32 and a conduit 34 is connected to the source to lead the fuel to the central portion of the assembly. A branch conduit 36 is connected to conduit 34 and extends across the width of the assembly, being connected to the various fuel manifolds or headers 38 of the individual cells. Fuel thus flows from the source 32 through supply conduit 34, branch conduit 36, headers or manifolds 38 and down between the cells to exhaust headers 40, then to branch conduit 42 and exhaust conduit 44. It will be understood that the upper half of the cell assembly, not shown, is substantially identical but in mirror image, and the fluids flow upward to exhaust.

Turning to FIG. 1, the general outline of the electrolyte supply and circulation system is illustrated. This includes an external manifold 46 which receives the liquid from one half of the upper or lower cell unit assembly at the left end as viewed in FIG. 1 and conducts it to an enlarged section 48 for removal of water and exhaust gas. Partition means are provided to segregate the electrolyte from each cell and minimize short circuit losses. The details of construction and operation will be outlined later herein. Housing 52 overlies this portion of manifold 46 and is surmounted by a vacuum pump 54 for water and exhaust gas removal. A recirculation pump 56 for the electrolyte pump forces electrolyte through the cell units from right to left as viewed in FIG. 1, the flow being perpendicular to the flow of gases. A filter 58 is also provided for physical or chemical removal of carbonates and other impurities from the electrolyte and is connected to the circulation system by conduits 60 and 62.

Figure 3:
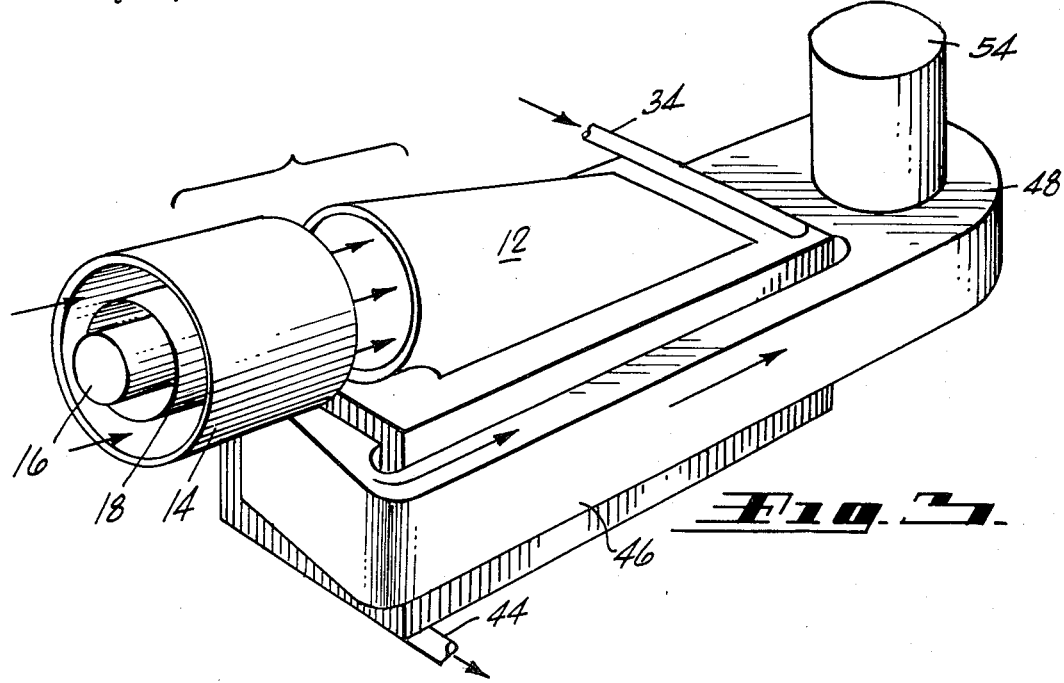
FIG. 3 is an idealized representation in perspective of a portion of the device of FIGS. 1 and 2.

FIG. 3 illustrates schematically a portion of the assembly with the outer casing removed to show the relation of the various primary components and the direction of flow of the gases and electrolyte. It will be seen that the fan unit delivers air (oxidant) to manifold 12 which overlies all of the cell units in this group. The air passes directly down between the cell units and out of the bottom of the assembly. Fuel enters through conduit 34 and is distributed to the appropriate headers, not shown, and then passes down between the cell units and out through conduit 44. Electrolyte passes fore and aft through the cell units and is recircled through manifold 46 and its enlarged section 48. While the particular directions of flow of the three fluids with respect to each other and the total assembly are not critical to the theory or mode of operation and may be varied in accordance with design considerations, the arrangement shown is presently preferred because it appears to be best for compactness, minimum weight, and ease of manufacture.

One of the most important present day uses for the invention disclosed herein is the provision of a suitable power source for automotive vehicles which will eliminate the smog problem and at the same time afford economical, simple and trouble-free operation. The fuel cell batteries previously available would take care of the smog problem and were relatively trouble-free and simple to operate. However, they were not adequate for automotive purposes and could not be considered practical because of their high cost and excessive size and weight. The reasons for their unsuitability are generally known.

The ion exchange resin and membrane type battery is fairly compact in the sense that it can be built with little waste space. However, although it has satisfactory chemical compatibility with various fuels, oxidants, etc., the ion mobility is low, reducing the power output per unit of volume or weight to such point that it is impractical for automotive use.

The liquid electrolyte type scores much higher in this regard but those previously available have still been far too bulky and heavy to be commercially worth while. The most advanced systems proposed by a leading supplier weigh at least 25 pounds per kilowatt and have a volume of about one half cubic foot per kilowatt. Since 100 kilowatts is a practical minimum for automotive use it is apparent that such a power unit would be impractical.

Some of the requirements for a usable system are that a maximum area of catalytically active material be in contact with the reacting chemicals to obtain a suitable reaction rate, the electrode cross section must be adequate to carry away the electrons generated, the electrolyte should be resistant to electron conduction but capable of ion conduction, a very thin film or zone of action is necessary for full utilization of the electrode area, and the electrolyte must be urged into intimate contact with the catalyzed material. The system embodying the present invention utilizes available materials to satisfy these and other requirements, and to produce a 100 kilowatt power source which, without accessories, has a weight of about 200 pounds and a volume of about one and one half cubic feet or less. While other materials may be used to operate on the same principle, it is presently preferred to use hydrogen for fuel, air or oxygen for oxidant, potassium hydroxide or phosphoric acid for electrolyte, and carbon for electrodes.

Figure 4:
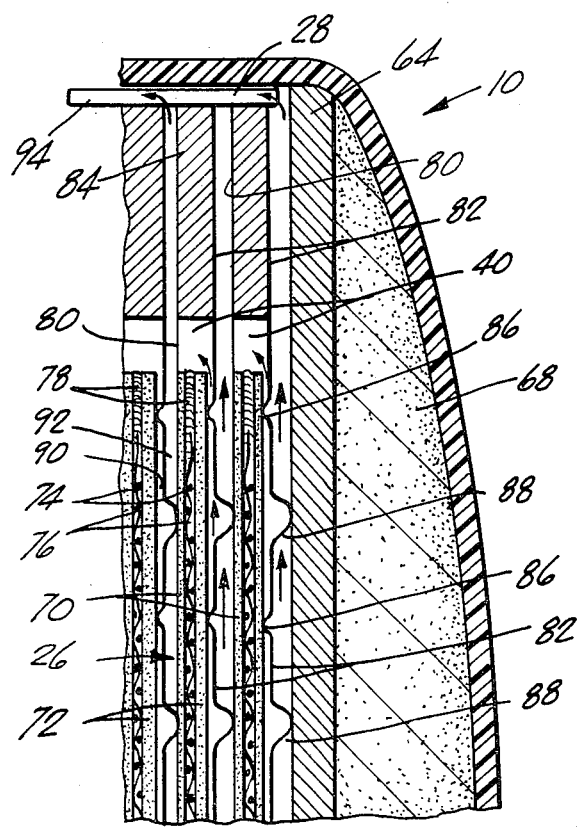
FIG. 4 is a sectional view, taken on line 4—4 of FIG. 2, on a greatly enlarged scale, showing details of the cell units and flow passages.

The detailed construction of the cell units and their relative arrangement are shown in FIG. 4, which is a section taken on line 4—4 of FIG. 2 at the flow outlets of the fuel and oxidant. The casing 10 is made of strong, non-conducting material such as a plastic, or glass cloth impregnated with plastic. Plate 64, preferably of copper, serves as a current collector and also as a pressure plate to maintain the cell units and dividers in contact, and is connected by means, not shown, to one of the power output terminals 66 in FIGS. 1 and 2. The casing is somewhat curved to facilitate the application of pressure and the space between it and pressure plate 64 is filled with a foam plastic core 68.

Each of the cell units 26 includes a cathode 70 and an anode 72, each comprising a layer of porous carbon approximately .005 inch thick, with their reacting or electrolyte surfaces coated with a hydrophobic material such as Teflon, and a catalytic coating of activated carbon in a suitable porous binder. The carbon is extremely finely divided and each particle is preferably completely coated with a suitable catalyst for maximum activity, and the particles are applied in such manner as to produce a rugose surface, increasing the contact area to a maximum.

When the .002 inch thick carbon layer is used, the electrochemical action may be significantly enhanced. Research has determined that ion transfer takes place effectively in only a very thin interface. Thus, with the extremely thin electrode, the hydrophobic material may be applied to the back (fuel or oxidant) face leaving the catalyzed front (electrolyte) face free for maximum chemical reaction. Because of the extreme thinness, the hydrophobic material on the back face is effective to prevent penetration of the electrode by the electrolyte.

An electrolyte separator layer 74 is arranged between the anode and cathode and held in tight facewise contact with both of them by pressure applied by the casing, thus defining and maintaining an electrolyte passage 76 with a constant minimum spacing between the electrodes of the order of .0025 inch. Layer 74 may take various forms but preferably consists of glass fiber filaments oriented substantially parallel to the flow path of the electrolyte. A minimal number of cross filaments may be added to facilitate construction. The layer is insulative but highly permeable to ion flow, and its surface is wettable. It thus provides the minimum practical spacing between the electrodes for maximum ion flow (or efficiency) and, because the spacing is so small, the wettable surface constantly urges the electrolyte into intimate contact with the catalyzed material. The minimum spacing is in striking contrast to the spacing of .080 inch which those working in the field up to now have considered as the practical minimum because they were operating on the principle of pressure forces overcoming surface tension forces. The flow through passages 76 is in a direction perpendicular to the plane of the paper in FIG. 4, and therefore lateral leakage is prevented by filling the side margins of these passages with a suitable plastic material 78 which will bond to carbon and be impervious to the electrolyte, and also be a non-conductor.

The cell unit structural assembly is completed by a plurality of barriers and spacers. A marginal plate 80 is secured to and extends beyond the margin of each cathode 70 to form part of a fuel gas header. It is impervious to gases and may or may not be electrically conductive. A plurality of gas impervious, conductive barrier layers 72 are arranged between each pair of cell units and their margins are coextensive with the margins of plates 80. A part of the space between each set of one place 80 and one layer 82 beyond the margin of the electrodes is filled with a non-conductive, gas impervious, plastic material 84 bonded to the plate and layer to complete the defining of fuel gas exhaust manifold or header 40.

Barrier layer 82 in its presently preferred form is essentially a flat sheet provided with protuberances extending in opposite directions with respect to the general plane of the layer to contact the surfaces of the adjacent cell units for the purpose of spacing the main body of the layer from both cell units and also to provide electrical series connection between them. The spacing provides for the flow of fuel gas on one side of the barrier layer and oxidant gas on the other side. Any suitable type of protuberance may be used but it has been found that very satisfactory results are obtained by the use of oppositely directed dimples. Thus the dimples 86 contact anodes 72 and the dimples 88 contact cathodes 70, completing series connections between adjacent cell units. At the same time they form passages 90 for the flow of fuel and passages 92 for the flow of oxidant. The directional arrows indicate how fuel flows to exhaust header 40, and eventually to outlet conduit 44, and oxidant flows to exhaust manifold 28, and eventually out through air pressure regulator 30.

The flow passages for fuel and oxidant may be of the same or different sizes. Operation of a fuel cell battery produces heat which must be carried away and disposed of. Any of the fluids may be circulated through a heat exchanger for this purpose but this requires extra equipment which involves space, cost, and maintenance. The present device has been designed to use ambient air for the oxidant supply which thus handles heat rejection without the necessity of a separate heat exchanger. Since oxygen is used up in the reaction it is necessary to supply excess air to the system. For this reason, dimples 88 have been designed to be several times deeper or higher than dimples 86. Specifically, the barrier layer itself is .001 inch thick, dimples 86 are .002 inch high and dimples 88 are .010 inch high, providing passages of corresponding widths, so that the air passage has five times the flow capacity of the fuel passage.

From the above description it will be seen that an extremely compact battery assembly is provided in which complete cell units are only .0255 inch thick, all components are in facewise contact, and depthwise pressure is maintained on the assembly to maintain firm electrical and structural contact, and such contact causes all of the components to give each other structural support. To maintain the assembly properly located as shown in FIG. 4, a few widely separated elongate spacer members 94 may be arranged longitudinally.

The structure at the gas entrance margins of the cell units is essentially identical to that at the exit margins, and is shown in section and perspective in FIG. 5 to clarify the relative arrangement and flow paths.

The manner of handling the electrolyte is illustrated in FIGS. 1 and 6. In the latter, it will be seen that the electrolyte passages 76 are open at their ends to allow the fluid to enter return passages 96 defined by plastic films 98. Each film has a height corresponding to the height of the cell unit and its free end is folded around an elongate plastic spacer 100. The spacer is inserted between a cathode 70 and barrier layer 82, and bonding material is applied to secure it in place and also to seal off the margins of the gas passages 90 and 92. Thus it will be seen that the gases are confined to flow perpendicular to the plane of the paper while the electrolyte flows to the left as seen in FIG. 6 and into return passages 96.

All of the films 98 are bonded together along their upper and lower longitudinal margins and are enclosed within the external return manifold 46 shown in FIG. 1. Consequently, the electrolyte which flows through each cell unit is maintained separate from the electrolyte in the other cell units. Turning to FIG. 1, the section 48 of manifold 46 is greatly expanded laterally, and the upper margins of films 98 are left unbonded for a length extending through section 48. Housing 52 overlies the area of section 48, and vacuum pump 54 can thus draw off the water and exhaust gas from the electrolyte. Pump 56 repeatedly comprises the passages between films 98 and forces the electrolyte back through the cell units. Filter 58 is connected to the upper and lower portions of manifold 46 by conduits 60 and 62 to serve as a by-pass filter and remove carbonates and other impurities from the electrolyte.

An alternative form of the electrodes and barrier layers is illustrated in FIGS. 7 and 8. The exploded view in FIG. 7 shows an anode layer 102 composed of a multiplicity of tubes 104 and a cathode layer 106 also composed of a multiplicity of identical tubes 108, separated by an electrolyte separator layer 110 which may be identical with layer 74 of FIGS. 4, 5, and 6. This construction is made possible by the development of new technology with which porous carbon tubes of extremely small diameter may be made by pyrolizing very small diameter hollow fibers of plastic such as rayon until only carbon crystals remain, and alternately heating and mechanically stretching until the desired size and porosity are attained. In the present case these hollow fibers or tubes have an outside diameter of .002 inch and an inside diameter of .001 inch. Their external surfaces are treated with hydrophobic material and catalyst in the same manner as electrodes 70 and 72. These tubes are arranged in side by side relation to form electrode layers, and one anode and one cathode are brought into facewise contact with separator layer 110 and sandwiched between barrier layers 112 having webs 114 and protuberances 116. The barrier layers may be made of metal or of plastic treated with metal to make them conductive.

Fuel gas passes through tubes 104 and permeates through their walls to the electrolyte passage containing separator layer 110. Oxidant gas passes through tubes 108 and permeates through their walls to the electrolyte passage. The total operation is the same as in the first form but structural differences are required to handle the flow of the various fluids. In FIG. 8, which is a section through alternate anode and cathode layers, an anode tube 104 is backed up by a barrier layer 112 which in turn is in contact with a pressure and current collector plate 118, electrically connected to a power output terminal. An electrolyte separator layer 110 is arranged between the anode tube 104 and the cathode tube 108. The series is repeated, starting with another barrier layer 112 until a pack of cell units is built up.

Considering a single complete cell unit, the gases from tubes 104 and 108 reach the interface with the electrolyte and react in the usual manner. However, since the tubes in a "layer" do not present a single flat face impervious to the electrolyte, the latter passes all around the tubes, and the electrolyte passage is actually bonded by each two barrier layers 112. Consequently, the entire outer surface of each tube is active except for the extremely small portions in contact with the protuberances. Thus a maximum amount of reactive area is provided in a minimum of volume.

The electrolyte flow path may be substantially the same as that depicted in FIGS. 1 and 6. However, a different arrangement is provided for the fuel and oxidant. The outer ends 120 of barrier layers 112 extend beyond the tube layers and are covered with a channel member 112 of conductive material which extends inwardly between adjacent layers of tubes to connect them electrically and support them structurally. Sealing material is applied inwardly of the channel members to prevent leakage of electrolyte. Between alternate rows of tubes, in alignment with the separator layers 110 are strips 124 of non-conductive plastic, their inner margins 126 being sealed by suitable material to prevent leakage of electrolyte.

The opposite outer margins 128 and 130 of strips 124 are folded in opposite directions over the outer margins 120 of adjacent barrier layers 112 to form a series of headers 142 and 144. Casing 136 surrounds the cell unit assembly and is divided by barriers, not shown, into a fuel inlet manifold 138 and an oxidant inlet manifold 140. As viewed in FIG. 8, fuel from manifold 138 flows down through tubes 104 in all of the anode layers into exhaust headers 142 which are suitably connected to an exhaust manifold, not shown. Similarly, oxidant from manifold 140 flows up through tubes 108 in all of the cathode layers into exhaust headers 144 which are suitably connected to an exhaust manifold, not shown.

Since it is not practical in this alternative system to provide passages large enough for excess cooling air, the cooling is accomplished by providing a heat exchanger in the electrolyte recirculating path. Whatever type of cooling is used in either system it is made adequate to maintain an operating temperature of about 100 degrees centigrade or less.

I claim:

1. A fuel cell battery comprising: a plurality of laterally extensive cell units stacked one upon another in facewise relation to form a multi-cell battery; each cell unit including a laterally extensive porous carbon fuel electrode and a laterally extensive porous carbon oxidant electrode in facewise juxtaposition and in spaced relation to provide a liquid electrolyte passage between them; said electrodes having a thickness of not more than about .005 inch and having fuel and oxidant surfaces and electrolyte surfaces; the electrodes being treated with porous hydrophobic material to inhibit penetration of electrolyte through the electrode walls and with porous catalytic material to support electrochemical action at the interfaces of the electrodes with the electrolyte; a separator layer between said electrodes and in pressural contact therewith and dimensioned to maintain an extremely small spacing between them to increase the efficiency of ion conduction to a minimum; said layer comprising a multiplicity of elongate glass fiber filaments arranged in widely spaced parallel relation to define a multiplicity of clear flow paths through the electrolyte passage with the combined areas of the flow paths amounting to a major portion of the cross sectional areas of the passage; the layer being electrically insulative and highly permeable to ion flow therethrough and the wettable surfaces of the filaments serving to maintain the liquid electroyte in contact with the electrolyte surfaces of the electrodes; an impervious, electrically conductive barrier layer arranged between each pair of adjacent cell units and having a multiplicity of protuberances extending out of its plane in opposite directions into pressural contact with the adjacent cell unit electrodes to connect all of the cell units in electrical series; and means to hold all of said cell units in tightly packed relation with the electrodes and spacer and barrier layers in rigid compressive contact throughout their facing areas to maintain the desired spacing and to cause said cell units to provide mutual structural support and maintain maximum electrical conductivity.

2. A battery as claimed in claim 1; each electrode comprising a layer of a multiplicity of individual hollow tubes of porous carbon having an outside diameter of about .002 inch and an inside diameter of about .001 inch arranged in parallel in lateral juxtaposition to each other and each electrolyte passage extending across between the confronting faces of successive barrier layers to surround the tubes and provide access of the electrolyte to substantially the entire outer surface of each individual tube.

3. A battery as claimed in claim 1; each cell unit including a fuel electrode comprising a multiplicity of individual extremely small hollow tubes of porous carbon arranged in a layer in side by side relation and adapted to carry a flow of fuel gas and to diffuse said gas from the interior of each tube to the exterior thereof; an oxidant electrode comprising a multiplicity of extremely small hollow tubes of porous carbon arranged in a layer in side by side relation and adapted to carry a flow of oxidant gas and to diffuse said gas from the interior of each tube to the exterior thereof; said layers being spaced apart by said separator layer; said cell unit being substantially enclosed by a pair of said barrier layers; the latter defining a flow path for electrolyte between and around the tubes of said cell unit; the protuberances on said barrier layers being in the form of elongate parallel spaced apart ribs extending across the axes of the tubes to contact the tubes in limited areas and space the main body of each barrier layer from its respective tube layer to afford access of electrolyte to substantially the entire outer surface of each individual tube.

4. A battery as claimed in claim 1; including an external circuit for the continuous recirculation of electrolyte through said cell units; said circuit providing individual conduit means for the flow of electrolyte through each cell unit to prevent commingling of the electrolyte and consequent short circuit power loss.

5. A battery as claimed in claim 1; and an external passageway for the recirculation of electrolyte through said cell units; said passageway containing a plurality of elongate flexible films extending from the exits to the entrances of the electrolyte passage in said cell units to provide separate flow paths for electrolyte through each cell unit; said films being sealed together along their entire lower elongate margins and along the major part of their upper elongate margins; a laterally enlarged section being provided in said passageway, and the upper margins of said films being separated from each other in said section; a vacuum pump located above said section to remove water vapor and exhaust gas from the electrolyte; and a recirculation pump downstream of said enlarged section to force electrolyte through said cell units.

6. A battery as claimed in claim 1; and an external passageway for the recirculation of electrolyte through said cell units; said passageway including individual flow paths for the flow of electrolyte through each cell unit to prevent commingling of the electrolyte and consequent short circuit power loss; a purging station in said passageway provided with means to remove contaminants from the electrolyte while maintaining the flow from each cell separate; and recirculation pump means incorporated in the pasageway to maintain flow of the electrolyte through said cell units.

7. A battery as claimed in claim 1; the means to hold the cell units in tightly packed relation including a pressure plate overlying each end of the stack of cell units; a pressure distributing core overlying each pressure plate and having a generally planar face in contact with the pressure plate and a dome-like outer face; and a casing surrounding all of the components and having dome-like end walls to apply endwise pressure to the cores.

8. A cell unit for a fuel cell type battery, comprising: a pair of generally planar electrodes arranged in parallel confronting relation with a small spacing between them to define a primary electrolyte passage; a separator layer between them in the electrolyte passage; and a pair of barrier layers enclosing the electrodes to define a complete cell; each electrode compriing a multiplicity of individual tubes of porous electrically conductive material arranged in a layer in side by side parallel relation and the tubes of both layers extending parallel to each other; the separator layer comprising a multiplicity of elongate filaments of electrically insulative material having wettable surfaces in contact with the surfaces of the tubes and spaced from each other in parallel relation along the lengths of the tubes to define electrolyte flow paths generally perpendicular to the axes of the tubes; the barrier layers being provided with elongate generally parallel protuberances in contact with the tube surfaces and extending generally perpendicular to the axes of the tubes; all of said layers being held in tightly compacted relation to each other to provide a total electrolyte passage extending between the confronting faces of the barrier layers and around the tubes to provide access of the electrolyte to substantially the entire outer surface of each individual tube and to form a rigid assembly in which all of the layers and the electrodes serve to reinforce each other structurally.

References Cited

UNITED STATES PATENTS

| | | | |
|---|---|---|---|
| 409,365 | 8/1889 | Mond et al. | 136—86 R |
| 2,612,532 | 9/1952 | Heise et al. | 136—86 A |
| 2,925,455 | 2/1960 | Eidensohn et al. | 136—86 A |
| 3,043,898 | 7/1962 | Miller et al. | 136—86 A |
| 3,505,113 | 4/1970 | Martin et al. | 136—160 X |
| 2,970,181 | 1/1961 | Corren | 136—146 X |
| 3,097,116 | 7/1963 | Moos | 136—86 X |
| 3,228,798 | 1/1966 | Hart | 136—86 |
| 3,347,708 | 10/1967 | Drengler | 136—86 |
| 3,415,734 | 12/1968 | Kalhammer | 136—86 X |
| 3,432,355 | 3/1969 | Niedrach et al. | 136—86 |
| 3,457,113 | 7/1969 | Deibert | 136—86 |

FOREIGN PATENTS

| | | | |
|---|---|---|---|
| 934,276 | 8/1963 | Great Britain | 136—86 R |
| 955,723 | 4/1964 | Great Britain | 136—86 R |
| 966,407 | 8/1964 | Great Britain | 136—86 R |

ALLEN B. CURTIS, Primary Examiner

U.S. Cl. X.R.

136—121

UNITED STATES PATENT OFFICE
CERTIFICATE OF CORRECTION

Patent No. 3692585            Dated September 19, 1972

Inventor(s) Alfred M. Mayo

It is certified that error appears in the above-identified patent and that said Letters Patent are hereby corrected as shown below:

Patentee's address should read
- - - 2639 Forest Grove Drive
     Richardson, Texas, 75080 - - -

Column 3, line 68, "recircled" should
    read - - - recirculated - - -

Column 5, line 39, "place" should
    read - - - plate - - -

Column 6, line 44, "comprises" should
    read - - - compresses - - -

Column 7, line 19, "bonded" should
    read - - - bounded - - -

Column 8, line 2, "minimum" should
    read - - - maximum - - -

Column 9, line 24, "compriing" should
    read - - - comprising - - -

Signed and sealed this 5th day of March 1974.

(SEAL)
Attest:

EDWARD M. FLETCHER, JR.          C. MARSHALL DANN
Attesting Officer                 Commissioner of Patents